US007692572B2

(12) United States Patent
Shirakawa

(10) Patent No.: US 7,692,572 B2
(45) Date of Patent: Apr. 6, 2010

(54) DETECTING AND RANGING APPARATUS AND DETECTING AND RANGING PROGRAM PRODUCT

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 12/000,510

(22) Filed: Dec. 13, 2007

(65) Prior Publication Data

US 2008/0204306 A1 Aug. 28, 2008

(30) Foreign Application Priority Data

Feb. 27, 2007 (JP) .............................. 2007-048141

(51) Int. Cl.
*G01S 13/00* (2006.01)
*G01S 13/08* (2006.01)
*G01S 13/58* (2006.01)

(52) U.S. Cl. .................... 342/70; 342/94; 342/104; 342/109; 342/126

(58) Field of Classification Search ................. 342/59, 342/70–72, 94–97, 104, 107, 109, 126
See application file for complete search history.

(56) References Cited

U.S. PATENT DOCUMENTS

| 4,060,809 A | * | 11/1977 | Baghdady | 342/451 |
| 4,611,211 A | * | 9/1986 | Leitl et al. | 342/107 |
| 4,833,469 A | * | 5/1989 | David | 340/901 |
| 5,615,680 A | * | 4/1997 | Sano | 600/437 |
| 5,872,536 A | * | 2/1999 | Lyons et al. | 342/70 |
| 5,920,280 A | * | 7/1999 | Okada et al. | 342/109 |
| 5,936,549 A | * | 8/1999 | Tsuchiya | 340/903 |
| 6,087,928 A | * | 7/2000 | Kleinberg et al. | 340/436 |
| 6,476,760 B1 | * | 11/2002 | Winter et al. | 342/173 |

(Continued)

FOREIGN PATENT DOCUMENTS

| JP | 08-124100 | 5/1996 |
| WO | 0026689 | 5/2000 |

OTHER PUBLICATIONS

Farina, A. et al. "Multiradar Tracking System Using Radial Velocity Measurements" IEEE Transactions on Aerospace and Electronic Systems, IEEE Service Center, Piscataway, N, US. vol AES-1O, No. 4, Jul. 1, 1979, pp. 555-563, XPOI 1166586 ISSN: 0018-925.*

(Continued)

*Primary Examiner*—Thomas H Tarcza
*Assistant Examiner*—Peter M Bythrow
(74) *Attorney, Agent, or Firm*—Hanify & King, PC

(57) ABSTRACT

A detecting and ranging apparatus and a program product obtain a correct relative velocity vector by a simple calculation based on a relative distance etc. obtained by a plurality of detectors such as a radar etc. by including: two relative distance measurement units receiving a reflected wave of a transmitted electromagnetic wave by an object to be detected, and thereby measuring a relative distance to the object to be detected, arranged at with each other different position; and an actual velocity vector calculation unit calculating an actual velocity vector of the object to be detected moving with an angle made in a direction from either relative distance measurement unit to the object to be detected based on the relative distances measured by the relative distance measurement units.

18 Claims, 10 Drawing Sheets

U.S. PATENT DOCUMENTS 6,522,288 B1 * 2/2003 Paradie et al. ............... 342/145
6,628,227 B1 * 9/2003 Rao et al. ..................... 342/70

OTHER PUBLICATIONS

European Search Report based on EP 07150154 (dated Jun. 9, 2008).

Farina, A. et al. "Multiradar Tracking System Using Radial Velocity Measurements" IEEE Transactions on Aerospace and Electronic Systems, IEEE Service Center, Piscataway, N, US. vol. AES-10, No. 4, Jul. 1, 1979, pp. 555-563, XP011166586 ISSN: 0018-9251.
Communication pursuant to Article 94(3) EPC dated Dec. 3, 2009 issued in the corresponding EP Application No. 07150154.8-2220.

* cited by examiner

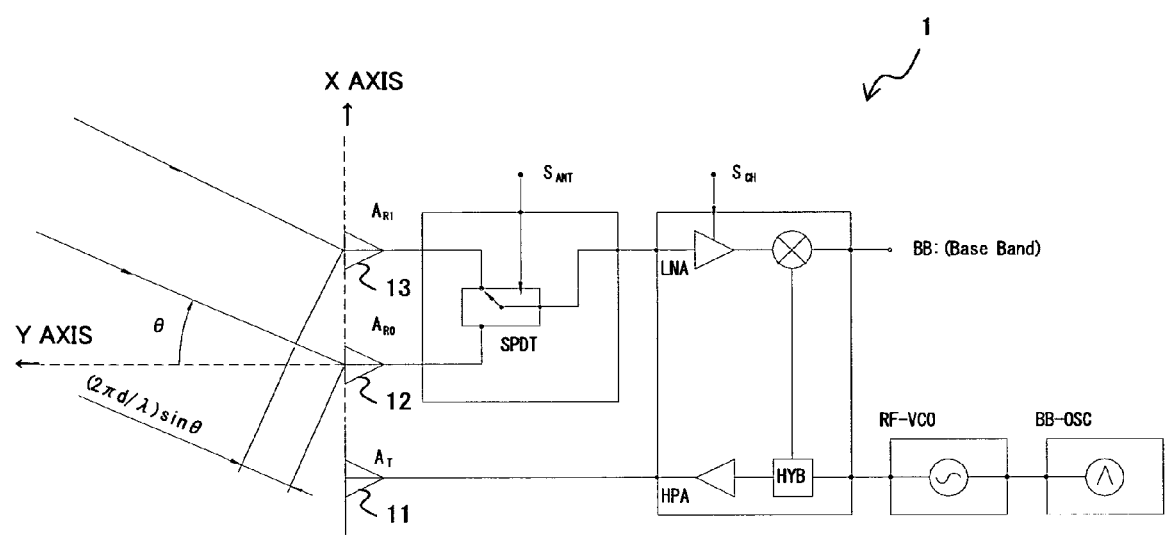
F I G. 1

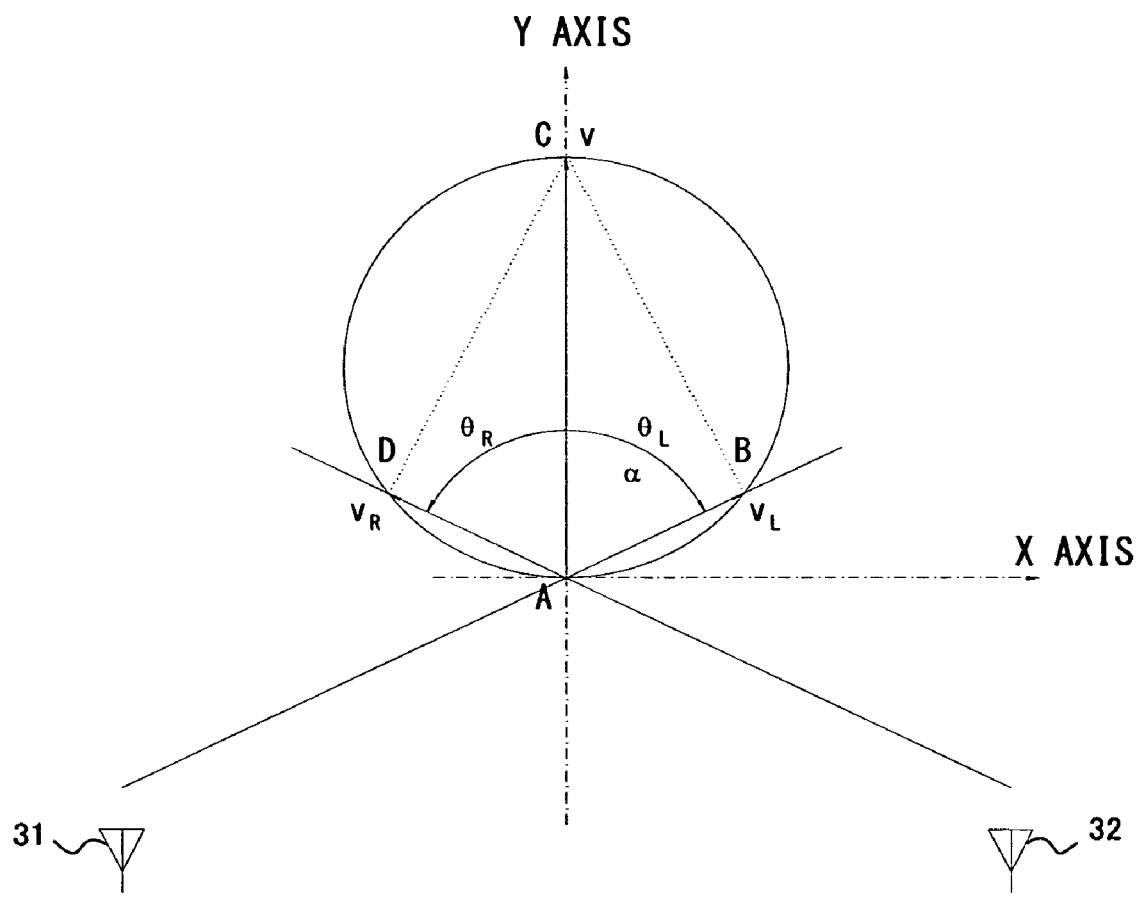
F I G. 6

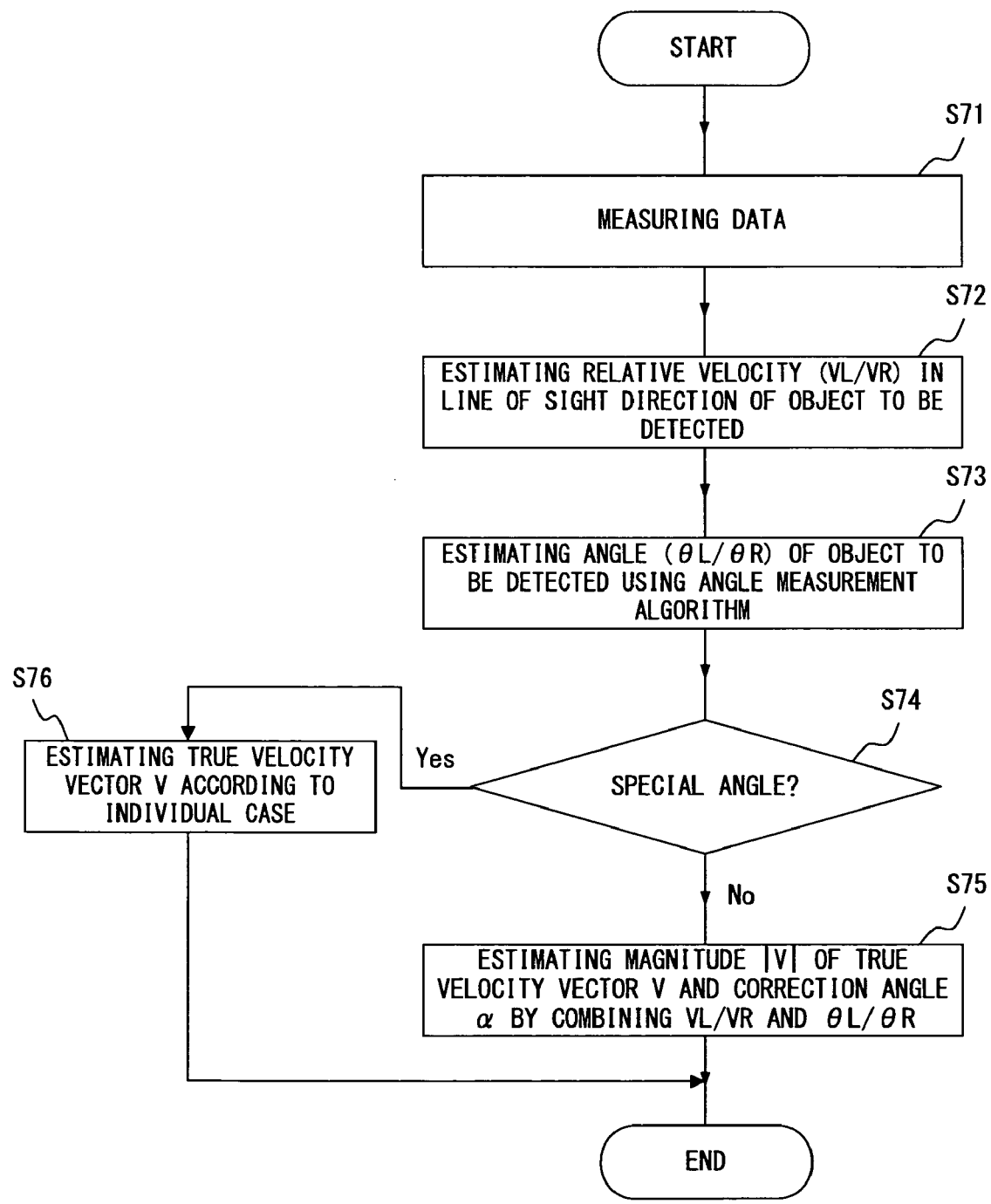
F I G. 7

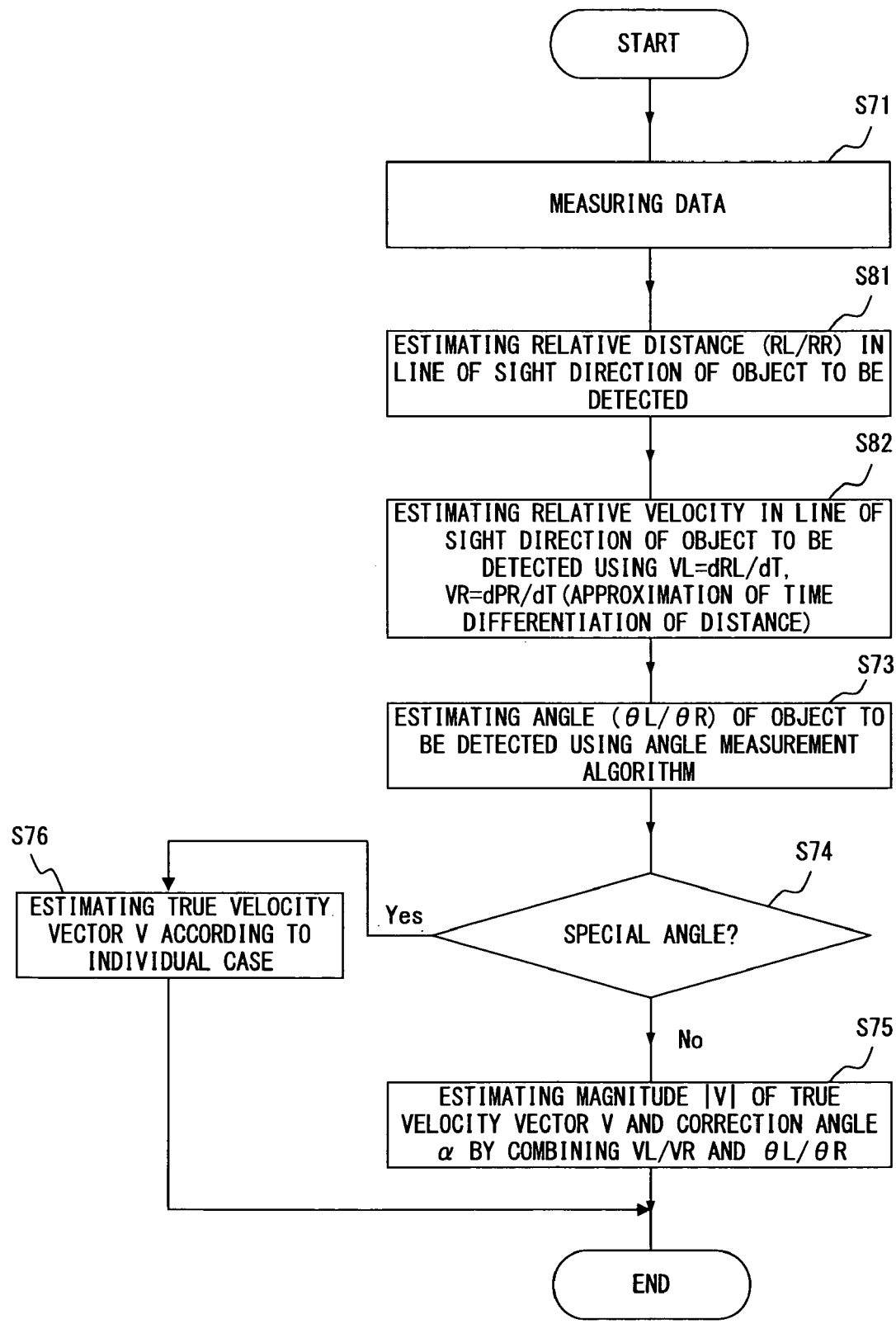
F I G. 8

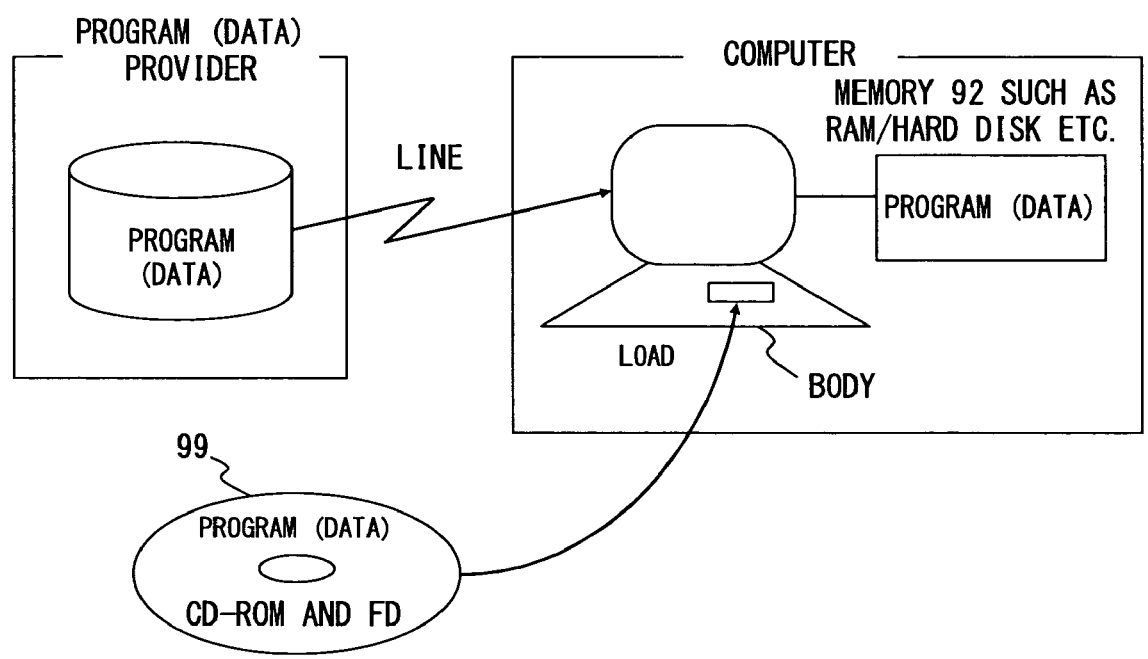
F I G. 1 0

DETECTING AND RANGING APPARATUS AND DETECTING AND RANGING PROGRAM PRODUCT

BACKGROUND OF THE INVENTION

1. Field of the Invention

The present invention relates to the technology for use in a moving object such as a vehicle and for obtaining a relative velocity vector to the moving object, and more specifically to a detecting and ranging apparatus and a detecting and ranging program product capable of obtaining a correct relative velocity vector in a simple calculation based on a relative distance or a relative velocity obtained by a plurality of detectors such as a radar.

2. Description of the Related Art

There has conventionally been an apparatus loaded into a vehicle such as an automobile for detecting the relative position and relative velocity to an object to be detected such as another vehicle with respect to the vehicle into which the apparatus is loaded.

For example, the following document discloses the technology of obtaining the difference of the virtual central point of a pivot on the road and the direction angle of an object to be detected by a single detector from a beam angle or a scan angle, and calculating the distance from the object to be detected.

There is also the disclosed technology of using a plurality of detectors.

For example, a radar capable of estimating all amounts of a relative distance, a relative velocity, and a direction with respect to an object to be detected.

Described below as a practical example of such a radar is a phase monopulse radar for estimating a distance and a velocity in the RMCW (frequency modulated continuous wave) system as a radar system for frequency modulating a transmission wave by a triangular wave etc., and estimating a direction in a phase monopulse system (However, they are simply referred to as a monopulse, and a monopulse radar).

FIG. 1 is an explanatory view of the configuration of the conventional monopulse radar.

In FIG. 1, a monopulse radar 1 is a simple system including a transmission antenna 11, two reception antennas (a first reception antenna 12 and a second reception antenna 13).

In this example, the first reception antenna 12 for a phase standard is set to the origin of the Cartesian coordinates (orthogonal coordinates, Descartes coordinates) (in FIG. 1, the direction of the array of the antennas is set as the X axis, and a direction orthogonal to the X axis is set as the Y axis), and the angle of the object to be detected that is measured with the clockwise on the positive Y axis set as the positive direction of an angle is θ. For simplicity, it is considered that each size of the antennas 11, 12, and 13 can be ignored with respect to the apparatus to which the monopulse radar 1 is loaded, and the geometry of each of the antennas 11, 12, and 13 is planar.

FIG. 2 is an explanatory view showing an example of a practical operation of a monopulse radar.

In FIG. 2, the monopulse radar 1 described above with reference to FIG. 1 is loaded into an own vehicle 21 such as an automobile, and detects another vehicle 22. In the state of the own vehicle 21 and the other vehicle 22, dLOS indicates the relative distance of the other vehicle 22 with respect to the own vehicle 21, ΘLOS indicates the angle clockwise from forward (Y axis direction) the own vehicle 21 to the position of the other vehicle 22, and vLOS indicates the relative velocity of the other vehicle 22 with respect to the own vehicle 21. It is assumed that the own vehicle 21 and the other vehicle 22 are moving, and the monopulse radar 1 is loaded at the forward center of the own vehicle 21.

In the above-mentioned state, the relative velocity vLOS is obtained by performing an orthogonal projection on the moving velocity v of the other vehicle 22 on the line of sight connecting the own vehicle 21 and the other vehicle 22.

For example, FIG. 2 shows the state often encountered in the actual running environment when the other vehicle 22 interrupts the own vehicle 21 in the lane. However, when the velocity (in the X axis direction) when the lane of the own vehicle 21 crosses the sane of the other vehicle 22 is calculated by the following equation (1).

$$v_{LOS} \sin \theta_{LOS} \tag{1}$$

The relative velocity vLOS cannot be determined whether it is an orthogonal projection of the moving velocity v or an orthogonal projection of another moving velocity, for example, v', only from other two pieces of information, that is, relative distance dLOS and angle θLOS. Although it is certain that the moving velocity v is an actual velocity, the actual velocity vX of the other vehicle 22 in the X axis direction can be calculated using the moving velocity v of the other vehicle 22 and, for example, an angle α made with the X axis by the following equation (2) (check the direction of α).

$$v_x = v \cos \alpha = v_{LOS} \cos \alpha / \sin(\theta_{LOS} + \alpha) \tag{2}$$

When angle ΘLOS is not 0 (ΘLOS≠0), the observation error is defined by the following equation (3).

$$\frac{v \cos \alpha}{v_{LOS} \sin \theta_{LOS}} = \frac{\cos \alpha}{\sin \theta_{LOS} \sin(\theta_{LOS} + \alpha)} \tag{3}$$
$$= \frac{2 \cos \alpha}{\cos \alpha - \cos(2\theta_{LOS} + \alpha)}$$
$$= \frac{2}{1 - \cos 2\theta_{LOS} + \sin 2\theta_{LOS} \tan \alpha}$$
$$= \frac{2}{2\sin^2 \theta_{LOS} + 2\sin \theta_{LOS} \cos \theta_{LOS} \tan \alpha}$$
$$= \frac{1}{\sin^2 \theta_{LOS}(1 + \tan \alpha / \tan \theta_{LOS})}$$

It is clear that the error is exceedingly large when the angle ΘLOS→0 or α→−θLOS.

Document: Japanese Patent Application Publication No. H8-124100

In the conventional technology above, the shorter the relative distance dLOS between the own vehicle 21 and the other vehicle 22 is, the less time is allowed to the own vehicle 21 in response to the behavior of the other vehicle 22, thereby causing the danger of a clash between the own vehicle 21 and the other vehicle 22.

As a result, there is a proposition that the above-mentioned disadvantage can be overcome by using a plurality of monopulse radars 1. Although there are some examples of the apparatuses by simply using a plurality of monopulse radars 1, they are based on the angle of an object to be detected, or a distance measurement, and there are no examples based on the estimation of the actual velocity of the object to be detected.

FIG. 3 is an explanatory view of the problem occurring when two monopulse radars are used.

For simple explanation, as shown in FIG. 3, a left radar 31 and a right radar 32 are loaded on the left and right forward of the own vehicle 21. FIG. 3 shows only the actual velocity v of the other vehicle 22 as an object to be detected, the relative velocity vL between the own vehicle 21 and the other vehicle 22 measured by the left radar 31, the angle ΘL clockwise from forward (Y axis direction) of the own vehicle 21 to the position of the other vehicle 22, and the relative velocity vR and the angle ΘR measured by the right radar 32.

When the actual velocity v is obtained, it is considered that these four amounts of measurement (relative velocity vL, relative velocity vR, angle ΘL, and angle ΘR) can be combined. However, there are two serious problems only by expanding the conventional methods.

(First Problem)

When the projection (vL sin ΘL, vR sin ΘR) of the relative velocity vL and vR in the X axis direction, and the projection (vL cos ΘL, vR cos ΘR) in the Y axis direction are used, the projection of the actual velocity v in the X and Y axis directions is expressed by the following equation (4) with respect to certain linear coupling coefficients a, b, c, and d as clearly shown in FIG. 3.

$$v_X = av_L \sin\theta_L + bv_R \sin\theta_R$$

$$v_Y = cv_L \cos\theta_L + dv_R \cos\theta_R \quad (4)$$

However, since the linear coupling coefficients a, b, c, and d are unknown, it is necessary to estimate them by any means. In estimating the linear coupling coefficients a, b, c, and d, a large volume of data and calculation are required, and it is not practical to implement them when there are problems of quick response and a low speed calculation device.

(Second Problem)

FIG. 4 is an explanatory view showing the second problem.

As shown in FIG. 4, aside from the first problem, v and, for example, v'L are considered as candidates for the actual velocity for the relative velocity vL and the angle ΘL, and v and, for example, v'R are considered as candidates for the actual velocity for the relative velocity vR and the angle ΘR. The second problem comes from that the angle ΘL and the angle ΘR only indicate the amount of the inclination of the relative velocity vL and vR to the Y axis. To solve the problem, it is necessary to specify the relative position among the v, v'L, v'R including the actual velocity v to be obtained.

Conventionally, these first and second problems have been overlooked, and most of the techniques relating to radars are oriented to the improvement in accuracy of the measurement amount in the direction of the line of sight.

As described above, when a conventional detecting and ranging apparatus is solely used, the relative distance and the angle between an object A (the own vehicle 21 above) loaded with the detecting and ranging apparatus and the object B to be detected (the other vehicle 22 above), and the relative velocity in the direction of the line of sight between the object A and the object B to be detected can only be estimated. In addition, it has not conventionally been highly regarded that it is difficult to estimate the actual velocity of an object to be detected, and no means to solve the problem (difficulty in estimating the actual velocity of an object to be detected) have been devised.

On the other hand, it has not been an idea of estimating the actual velocity of an object to be detected although there are only a few propositions of improving the measurement accuracy in the distance, angle, or velocity in the direction of the line of sight with respect to the object B to be detected by combining a plurality of detecting and ranging apparatuses.

Although the above-mentioned detecting and ranging apparatus is used, it is very hard (for example, in processing a large volume of data) to estimate the actual velocity of an object B to be detected unless an important point is considered.

SUMMARY OF THE INVENTION

The present invention has been developed to overcome the above-mentioned problems, and aims at providing a detecting and ranging apparatus and a detecting and ranging program product capable of obtaining a correct relative velocity vector by a simple calculation based on the relative distance or relative velocity obtained by a plurality of detectors such as radars.

To solve the above-mentioned problems, the present invention has the following configuration.

That is, according to an aspect of the present invention, the detecting and ranging apparatus of the present invention includes: a first relative distance measurement unit for receiving a reflected wave of a transmitted electromagnetic wave by an object to be detected, and thereby measuring a relative distance to the object to be detected; a second relative distance measurement unit, arranged at a position different from a position of the first relative distance measurement unit, for receiving a reflected wave of a transmitted electromagnetic wave by an object to be detected, and thereby measuring a relative distance to the object to be detected; and a first actual velocity vector calculation unit for calculating an actual velocity vector of the object to be detected moving with an angle made in a direction from the first relative distance measurement unit to the object to be detected or a direction from the second relative distance measurement unit to the object to be detected based on the relative distance measured by the first relative distance measurement unit and the relative distance measured by the second relative distance measurement unit.

According to another aspect of the present invention, the detecting and ranging apparatus of the present invention includes: a first relative velocity measurement unit for receiving a reflected wave of a transmitted electromagnetic wave by an object to be detected, and thereby measuring a relative velocity to the object to be detected; a second relative velocity measurement unit, arranged at a position different from a position of the first relative velocity measurement unit, for receiving a reflected wave of a transmitted electromagnetic wave by an object to be detected, and thereby measuring a relative velocity to the object to be detected; and a second actual velocity vector calculation unit for calculating an actual velocity vector of the object to be detected moving with an angle made in a direction from the first relative velocity measurement unit to the object to be detected or a direction from the second relative velocity measurement unit to the object to be detected based on the relative velocity measured by the first relative velocity measurement unit and the relative velocity measured by the second relative velocity measurement unit.

According to a further aspect of the present invention, the detecting and ranging apparatus of the present invention includes: a first measurement unit for receiving a reflected wave of a transmitted electromagnetic wave by an object to be detected, and thereby measuring a relative distance and a relative velocity to the object to be detected; a second measurement unit, arranged at a position different from a position of the first measurement unit, for receiving a reflected wave of a transmitted electromagnetic wave by an object to be detected, and thereby measuring a relative distance and a relative velocity to the object to be detected; and a third actual velocity vector calculation unit for calculating an actual velocity vector of the object to be detected moving with an angle made in a direction from the first measurement unit to the object to be detected or a direction from the second measurement unit to the object to be detected based on the relative distance and the relative velocity measured by the first measurement unit and the relative distance and the relative velocity measured by the second measurement unit.

It is desired that, in the detecting and ranging apparatus according to the present invention, the first measurement unit (the first relative distance measurement unit, the first relative velocity measurement unit, the first relative distance and relative velocity measurement unit) or the second measurement unit (the second relative distance measurement unit, the second relative velocity measurement unit, the second relative distance and relative velocity measurement unit) measures an angle made with and in the direction (of the line of sight) of the object to be detected, and the (first, second, third) actual velocity vector calculation unit corresponding to the valid combination of measurement units calculates the actual velocity vector of the object to be detected moving at the measured angle.

It is desired that, in the detecting and ranging apparatus according to the present invention, the first measurement unit (the first relative distance measurement unit, the first relative velocity measurement unit, the first relative distance and relative velocity measurement unit) or the second measurement unit (the second relative distance measurement unit, the second relative velocity measurement unit, the second relative distance and relative velocity measurement unit) is a pulse radar.

It is desired that, in the detecting and ranging apparatus according to the present invention, the first measurement unit (the first relative distance measurement unit, the first relative velocity measurement unit, the first relative distance and relative velocity measurement unit) or the second measurement unit (the second relative distance measurement unit, the second relative velocity measurement unit, the second relative distance and relative velocity measurement unit) is a frequency spread radar.

It is desired that, in the detecting and ranging apparatus according to the present invention, the first measurement unit (the first relative distance measurement unit, the first relative velocity measurement unit, the first relative distance and relative velocity measurement unit) or the second measurement unit (the second relative distance measurement unit, the second relative velocity measurement unit, the second relative distance and relative velocity measurement unit) is an FMCW radar.

According to an aspect of the present invention, the detecting and ranging program product of the present invention directs a computer of a detecting and ranging apparatus to function as: a first relative distance measurement unit for receiving a reflected wave of a transmitted electromagnetic wave by an object to be detected, and thereby measuring a relative distance to the object to be detected; a second relative distance measurement unit, arranged at a position different from a position of the first relative distance measurement unit, for receiving a reflected wave of a transmitted electromagnetic wave by an object to be detected, and thereby measuring a relative distance to the object to be detected; and a first actual velocity vector calculation unit for calculating an actual velocity vector of the object to be detected moving with an angle made in a direction from the first relative distance measurement unit to the object to be detected or a direction from the second relative distance measurement unit to the object to be detected based on the relative distance measured by the first relative distance measurement unit and the relative distance measured by the second relative distance measurement unit.

According to another aspect of the present invention, the detecting and ranging program product of the present invention directs a computer of a detecting and ranging apparatus to function as: a first relative velocity measurement unit for receiving a reflected wave of a transmitted electromagnetic wave by an object to be detected, and thereby measuring a relative velocity to the object to be detected; a second relative velocity measurement unit, arranged at a position different from a position of the first relative velocity measurement unit, for receiving a reflected wave of a transmitted electromagnetic wave by an object to be detected, and thereby measuring a relative velocity to the object to be detected; and a second actual velocity vector calculation unit for calculating an actual velocity vector of the object to be detected moving with an angle made in a direction from the first relative velocity measurement unit to the object to be detected or a direction from the second relative velocity measurement unit to the object to be detected based on the relative velocity measured by the first relative velocity measurement unit and the relative velocity measured by the second relative velocity measurement unit.

According to a further aspect of the present invention, the detecting and ranging program product of the present invention directs a computer of a detecting and ranging apparatus to function as: a first measurement unit for receiving a reflected wave of a transmitted electromagnetic wave by an object to be detected, and thereby measuring a relative distance and a relative velocity to the object to be detected; a second measurement unit, arranged at a position different from a position of the first measurement unit, for receiving a reflected wave of a transmitted electromagnetic wave by an object to be detected, and thereby measuring a relative distance and a relative velocity to the object to be detected; and a third actual velocity vector calculation unit for calculating an actual velocity vector of the object to be detected moving with an angle made in a direction from the first measurement unit to the object to be detected or a direction from the second measurement unit to the object to be detected based on the relative distance and the relative velocity measured by the first measurement unit and the relative distance and the relative velocity measured by the second measurement unit.

BRIEF DESCRIPTION OF THE DRAWINGS

FIG. 1 is an explanatory view of the configuration of a conventional monopulse radar;

FIG. 6 is an explanatory view showing the principle of the present invention in a special state;

FIG. 7 is a flowchart of the process of calculating the actual velocity based on the relative velocity;

FIG. 8 is a flowchart of the process of calculating the actual velocity based on the relative distance;

FIG. 10 is an explanatory view of loading the detecting and ranging program product according to the present invention into a computer.

DESCRIPTION OF THE PREFERRED EMBODIMENTS

The mode for embodying the present invention is described below with reference to the attached drawings.

First, the outline of the present invention is described.

The detecting and ranging apparatus in which the present invention is applied uses a plurality of radar apparatuses capable of estimating the relative distance, the relative velocity, an amount of angle etc. to an object to be detected, and performs signal processing based on the geometrical ground that "there is a circle enclosing a polygon configured by the relative velocity measured by each radar apparatus, and the actual velocity of the object to be detected equals its diameter" on the output signal from the radar apparatuses, and obtains the actual velocity of the object to be detected. Thus, the estimation of the actual velocity of the object to be detected from the amount of measurement such as a relative velocity etc. which has been difficult in the prior art can be realized only by simple signal processing.

Figure 2:
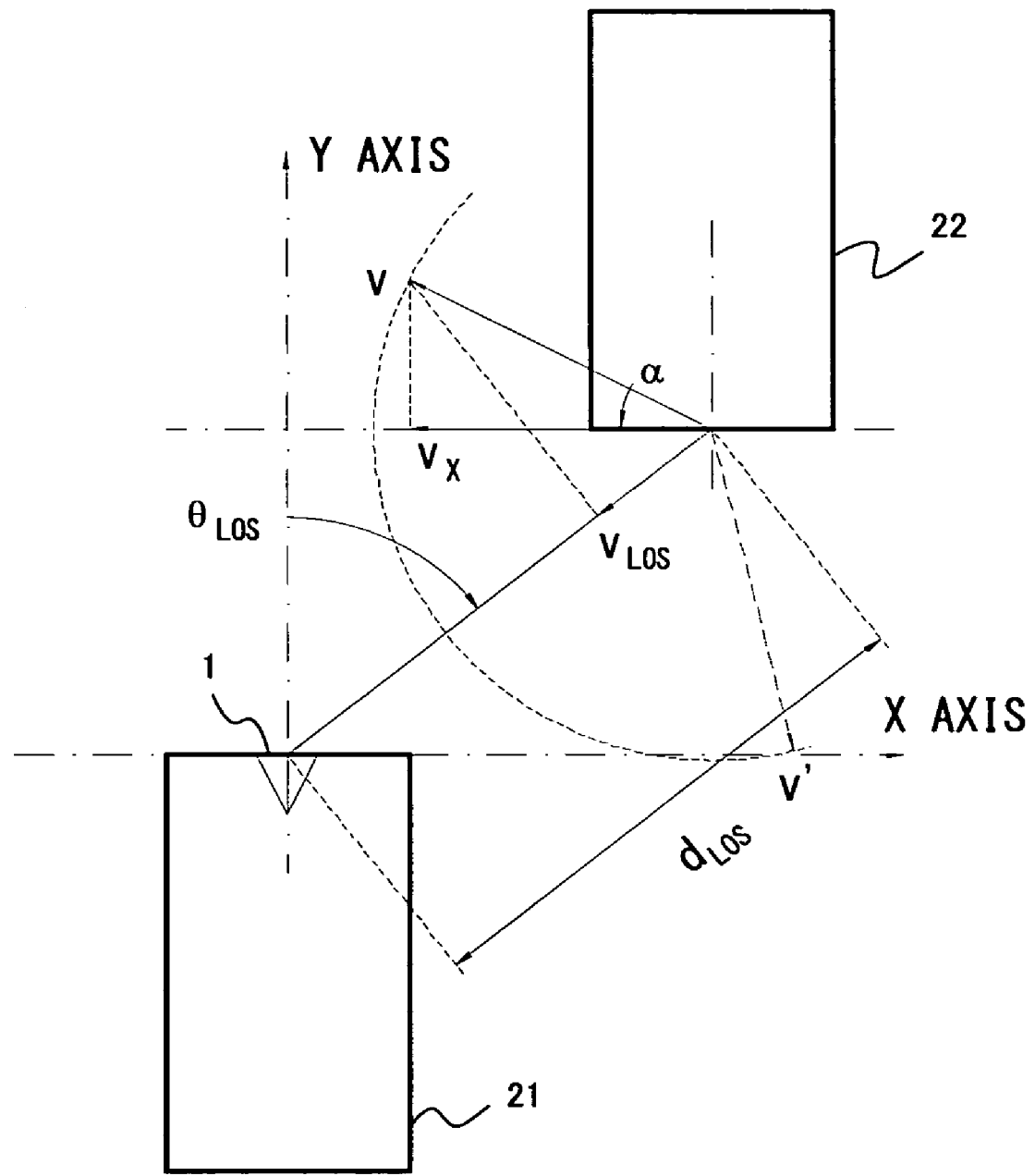
FIG. 2 is an explanatory view of a practical operation example of a monopulse radar.
Figure 3:
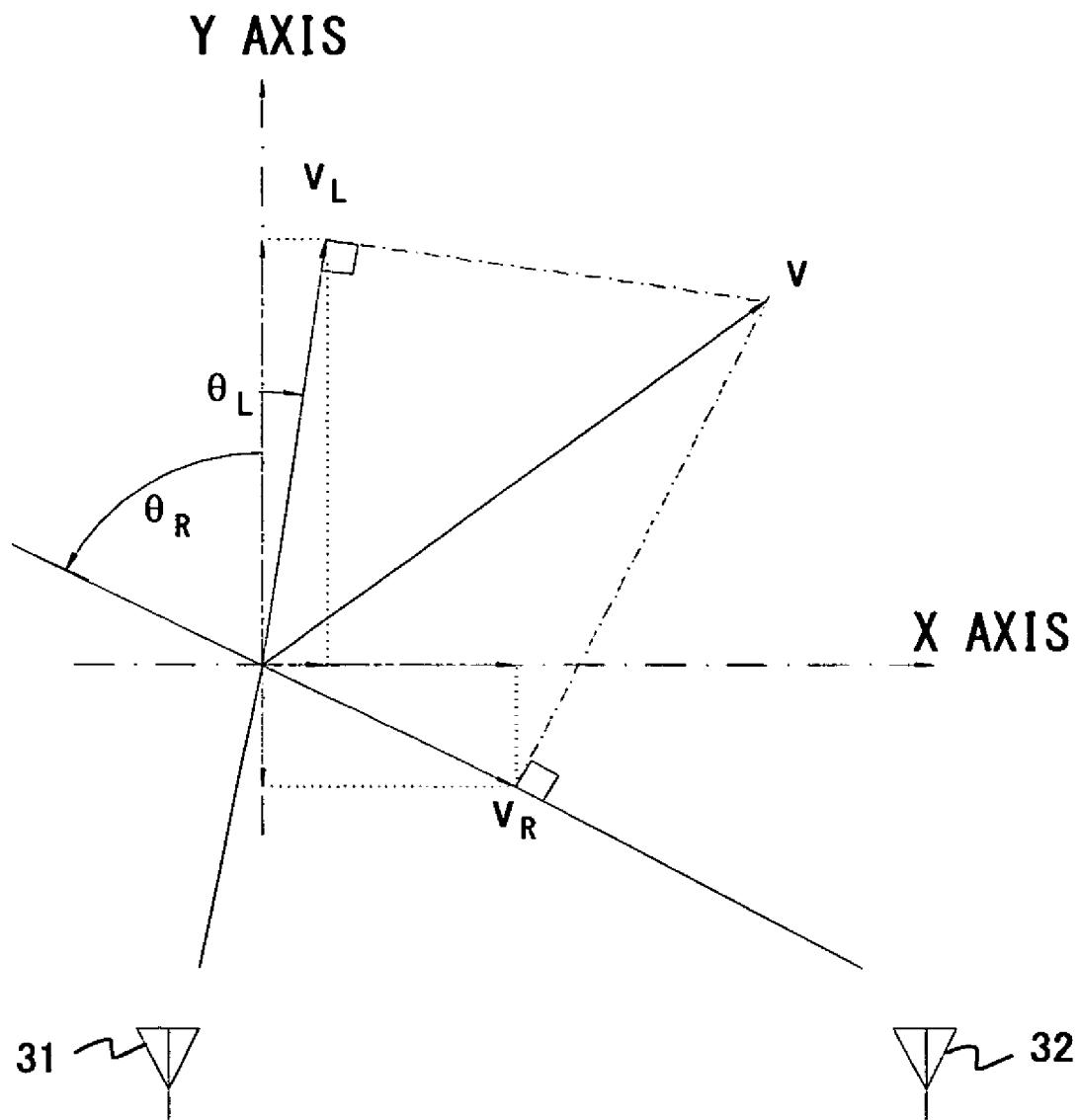
FIG. 3 is an explanatory view showing the problem when two monopulse radars are used.
Figure 4:
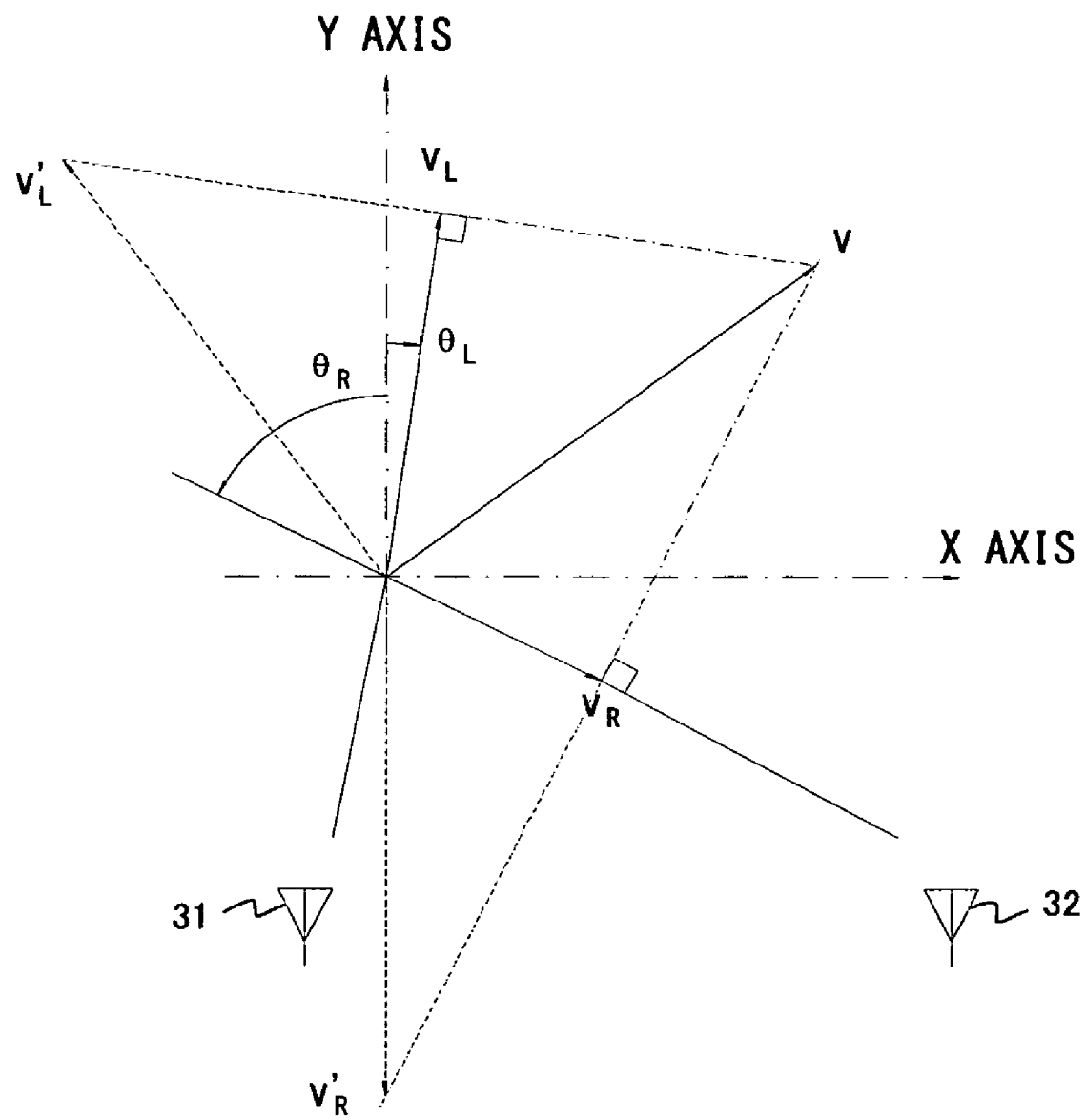
FIG. 4 is an explanatory view of the second problem.
Figure 5:
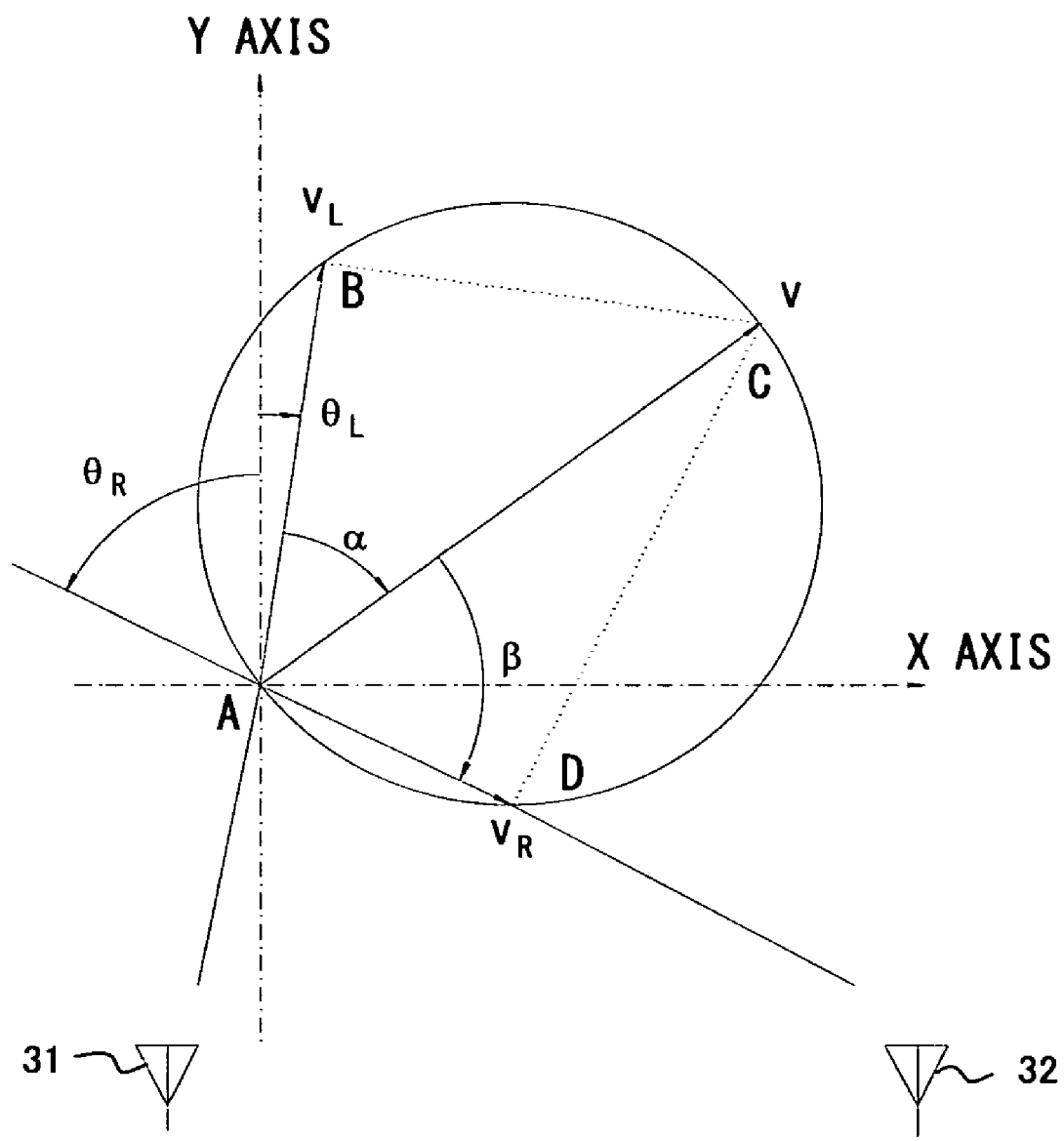
FIG. 5 is an explanatory view of the principle of the present invention.

FIG. 5 is an explanatory view showing the principle of the present invention.

The example shown in FIG. 5 is the simplest configuration example of the present invention, and the technical scope to which the present invention can be applied is not limited to the configuration shown in FIG. 5.

To simplify the comparison with the prior art, the detecting and ranging apparatus shown in FIG. 5 according to the present invention is also provided with the left radar 31 and the right radar 32 on the left and right forward of the own vehicle 21. In addition, only the actual velocity v of the other vehicle 22 as a object to be detected, the relative velocity vL between the own vehicle 21 and the other vehicle 22 measured by the left radar 31, the angle ΘL clockwise from the forward (Y axis direction) of the own vehicle 21 to the position of the other vehicle 22, and the relative velocity vR and the angle ΘR measured by the right radar 32 are indicated. The α and β respectively show the angle made by the relative velocity vL and the actual velocity v, and the angle made by the actual velocity v and relative velocity vR (the clockwise direction is assumed as a positive direction.)

The important point of the present invention is the geometric characteristic that "since the relative velocity vL and vR is the projection in the direction of the line of sight of the actual velocity v, there is a circle enclosing the rectangle ABCD configured by the three velocity vectors, and the actual velocity v is the diameter of the circle" is introduced to the signal processing.

First, the following equations (5) and (6) are obtained from the sine law.

$$\triangle ABC: \quad \frac{v}{\sin(\pi/2)} = \frac{v_L}{\sin(\pi/2 - \alpha)} = \frac{v_L}{\cos\alpha} \rightarrow v_L = v\cos\alpha \quad (5)$$

$$\triangle ACD: \quad \frac{v}{\sin(\pi/2)} = \frac{v_R}{\sin(\pi/2 - \beta)} = \frac{v_R}{\cos\beta} \rightarrow v_R = v\cos\beta \quad (6)$$

To avoid the complexity, it is assumed that v, vL, and vR indicate the magnitudes of the vector.

When the direction of the angle and the following equation (7) are considered, the following equations (8), (9), and (10) are derived and an unknown angle α can be obtained by the equations (11) and (12) by combining the equations (5) and (6).

$$\theta_L - \theta_R + \alpha + \beta = \pi \rightarrow \beta = \pi - (\theta_L - \theta_R + \alpha) \quad (7)$$

$$\cos\beta = \cos[\pi - (\theta_L - \theta_R + \alpha)] \quad (8)$$
$$= -\cos(\theta_L - \theta_R + \alpha)$$
$$= -m\cos\alpha + n\sin\alpha$$

$$m = \cos(\theta_L - \theta_R), \ n = \sin(\theta_L - \theta_R) \quad (9)$$

$$m^2 + n^2 = 1 \quad (10)$$

$$\frac{v_R}{v_L} = \frac{\cos\beta}{\cos\alpha} = \frac{-m\cos\alpha + n\sin\alpha}{\cos\alpha} = -m + n\tan\alpha \quad (11)$$

$$\alpha = \tan^{-1}\left[\frac{1}{n}\left(m + \frac{v_R}{v_L}\right)\right] \quad (12)$$
$$= \tan^{-1}\left\{\frac{1}{\sin(\theta_L - \theta_R)}\left[\cos(\theta_L - \theta_R) + \frac{v_R}{v_L}\right]\right\}$$

By the equations (8), (9), and (10), the following equation (13) is obtained, and the equation (14) can be obtained by the equations (5) and (6).

$$\cos^2\alpha - \cos^2\beta = \cos^2\alpha - (-m\cos\alpha + n\sin\alpha)^2 \quad (13)$$
$$= (1 - m^2)\cos^2\alpha + 2mn\cos\alpha\sin\alpha - n^2\sin^2\alpha$$
$$= n^2(\cos^2\alpha - \sin^2\alpha) + 2mn\cos\alpha\sin\alpha$$
$$= n^2\cos2\alpha + mn\sin2\alpha$$
$$= n(n\cos2\alpha + m\sin2\alpha)$$
$$= \sin(\theta_L - \theta_R)\sin(\theta_L - \theta_R + 2\alpha)$$

$$v = \sqrt{\frac{v_L^2 - v_R^2}{\sin(\theta_L - \theta_R)\sin(\theta_L - \theta_R + 2\alpha)}} \quad (14)$$

Therefore, by applying the signal processing device to the relative velocity vL, the relative velocity vR, the angle ΘL, and the angle ΘR indicating the amounts of measurement including the equations (12) and (14) above, a true velocity vector can be obtained.

When the equation (11) diverges (, which is determined in the implementation by setting an appropriate threshold), α≈π/2 (generally (2k+1)π/2, for k∈Z) is indicated. Therefore, the following equations hold.

$$v = +v_L \text{ or } -v_L$$

and $$\beta = +\lambda/2 \text{ or } -\lambda/2$$

The sign of the actual velocity v is determined from the sign of the relative velocity vR.

The principle of the present invention is described above, and described below is the case in which, in a special state, the actual velocity v is on the normal passing through the midpoint of the line connecting the left radar and the right radar.

FIG. 6 is an explanatory view showing the principle of the present invention in a special state.

As shown in FIG. 6, when the actual velocity v is on the normal (corresponding to the Y axis in FIG. 6) passing through the midpoint of the straight line connecting the left radar 31 and the right radar 32, the estimated actual velocity v can be derived from the equations (12) and (14) since the angles ΘL and ΘR are equal in measure and opposite in direction.

Next, the process of calculating the actual velocity performed by the detecting and ranging apparatus according to the present invention is described below with reference to a flowchart.

FIG. 7 is a flowchart of the process of calculating the actual velocity based on the relative velocity.

First, the detecting and ranging apparatus according to the present invention measures the data for the other vehicle 22 as an object to be detected using the left radar 31 and the right radar 32 in step S71.

Then, in step S72, the relative velocity vL and the relative velocity vR in the direction of the line of sight between the own vehicle 21 and the other vehicle 22 are estimated by an FFT (fast Fourier transform) etc.

Then, in step S73, using an angle measurement algorithm, the clockwise angles $\Theta L$ and $\Theta R$ of the other vehicle 22 measured from the forward (Y axis direction) of the own vehicle 21 are estimated.

Next, in step S74, it is determined whether or not the actual velocity v is at a special angle to the Y axis, for example, the actual velocity v is on the normal passing through the midpoint connecting the left radar 31 and the right radar 32. If it is determined that the angle is not special (NO in step S74), then in step S75, the magnitude of the actual velocity (true velocity vector) |v| and the correction angle α are estimated in the arithmetic operation described with reference to FIG. 5 by combining the relative velocity vL and the relative velocity vR between the own vehicle 21 and the other vehicle 22 estimated in step S72, and the clockwise angle $\Theta L$ and angle $\Theta R$ of the other vehicle 22 measured from the forward (Y axis direction) of the own vehicle 21 estimated in step S73.

On the other hand, if it is determined that the angle is special (YES in step S74), then in step S76, in the arithmetic operation described with reference to FIG. 6, the magnitude of the actual velocity (true velocity vector) |v| and the correction angle α are estimated by combining the relative velocity vL and the relative velocity vR between the own vehicle 21 and the other vehicle 22 estimated in step S72, and the clockwise angle $\Theta L$ and angle $\Theta R$ of the other vehicle 22 measured from the forward (Y axis direction) of the own vehicle 21 estimated in step S73.

Although the two left radar 31 and right radar 32 can only measure a distance, the relative velocity of the other vehicle 22 as an object to be detected can be obtained from the time differential of a distance, and the angle of the object to be detected can be obtained from the triangulation technique, or the information can be obtained from separately prepared means.

FIG. 8 is a flowchart of the process of calculating the actual velocity based on the relative distance.

The flowchart shown in FIG. 8 shows an example of the case where the two left radar 31 and right radar 32 can only measure a distance, and in stead of step S72 shown in FIG. 7, the relative distance RL and the relative distance RR in the direction of the line of sight between the own vehicle 21 and the other vehicle 22 are estimated in step S81, and the time differential of a distance is calculated in step S82, thereby estimating the relative velocity vL and the relative velocity vR in the direction of the line of sight between the own vehicle 21 and the other vehicle 22.

As described above, by realizing the present invention, the estimation of the actual velocity of an object to be detected from the amount of measurement, which has been difficult in the prior art, can be realized by simple signal processing.

In the above-mentioned mode for embodying the present invention, the detecting and ranging apparatus according to the present invention is loaded into an automobile, but the detecting and ranging apparatus according to the present invention can be loaded into a train to detect an object to be detected such as an automobile, a person, etc. entering the course of the train, and also loaded into a plane, a ship, etc.

Additionally, in the mode for embodying the present invention, an FMCW monopulse radar is used. However, the signal modulation system is not limited to the above-mentioned FMCW system, but a frequency spread system based on an orthogonal code, a chaotic code, noise, etc. can be adopted, and any system such as two frequency CW (FSK) system etc. can be used. An angle can be detected by not only the monopulse system, but also a mechanical sensing operation, a beam forming method, a subspace method, or a maximum likelihood method.

The mode for embodying the present invention has been described above with reference to the attached drawings. However, it is obvious that the detecting and ranging apparatus according to the present invention is not limited to the above-mentioned mode so far as its functions can be realized, that is, a single apparatus, a system including a plurality of apparatuses, an integrated apparatus, or a system for performing a process over a network such as a LAN, WAN, etc.

Figure 9:
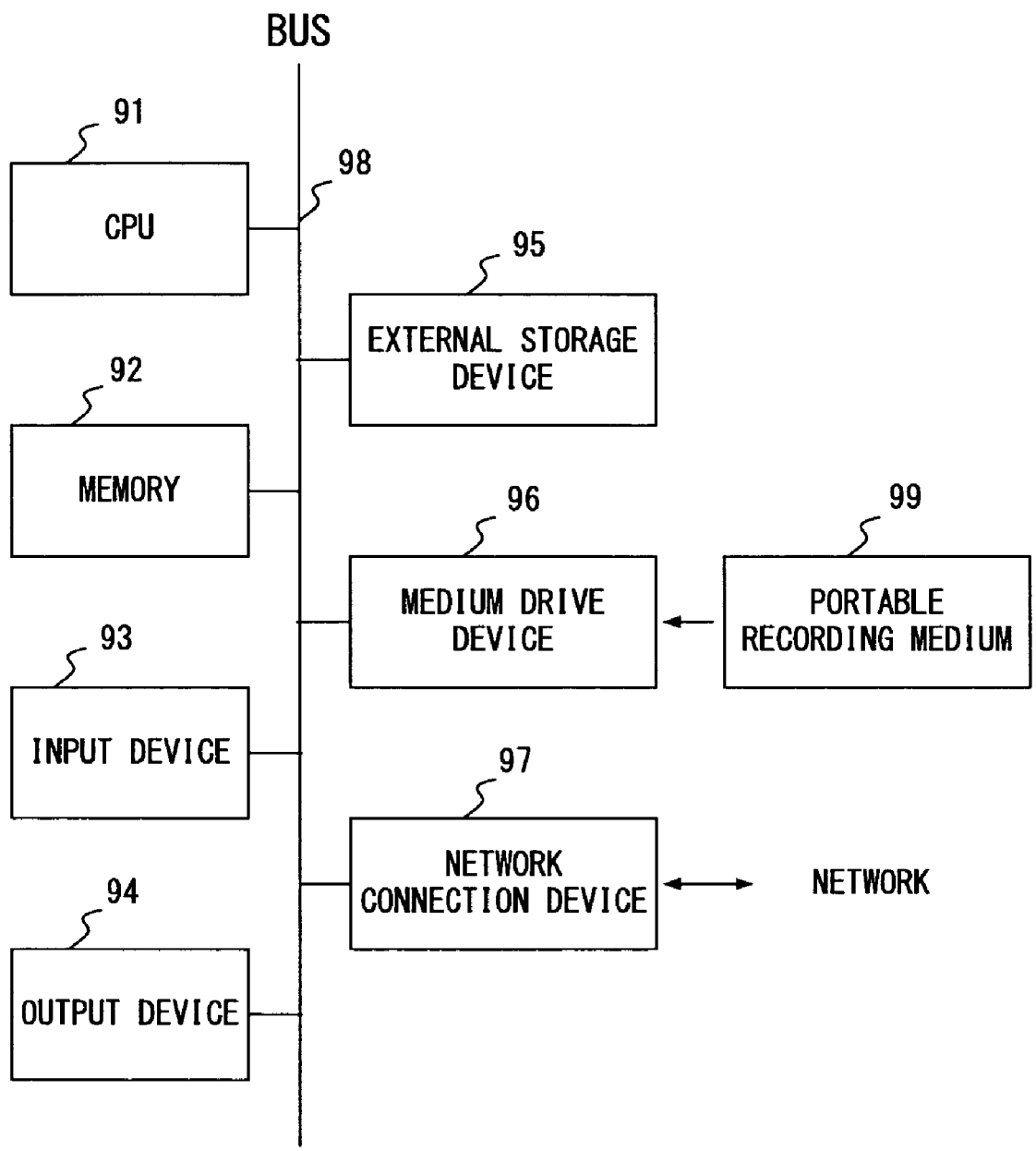
FIG. 9 shows the configuration of the detecting and ranging apparatus according to the present invention.

As shown in FIG. 9, the apparatus can also be implemented as a system including a CPU 91, memory 92 such as ROM and RAM, an input device 93, an output device 94, an external storage device 95, a medium drive device 96, a portable recording medium 99, a network connection device 97, which are interconnected via a bus 98. That is, the system according to the above-mentioned mode for embodying the present invention can be realized, by providing the computer of the detecting and ranging apparatus with a program code of software stored on the memory 92 such as the ROM and the RAM, the external storage device 95, the portable recording medium 99, and by making the computer to execute the program.

In this case, the program code itself read from the portable recording medium 99 etc. realizes new functions of the present invention, and the portable recording medium 99 etc. recording the program code configures the present invention.

The portable recording medium 99 for providing a program code can be, for example, a flexible disk, a hard disk, an optical disk, a magneto optical disk, CD-ROM, CD-R, DVD-ROM, DVD-RAM, a magnetic tape, a non-volatile memory card, a ROM card, various recordable media for recording by e-mail, personal computer communication, etc. via the network connection device 97 (that is, a communication circuit).

As shown in FIG. 10, by executing the program code read by the computer into the memory 92, the mode for embodying the present invention can be reified, and at an instruction of the program code, all or a part of the actual processes can be performed by an OS etc. operating on the computer, thereby realizing the functions of the above-mentioned mode for embodying the present invention.

Furthermore, the program code read from the portable recording medium 99 and the program (data) provided from a program (data) provider are written to the 92 in the feature expansion board inserted into the computer and the feature expansion unit connected to the computer, and then at the instruction of the program code, the CPU 91 etc. provided for the feature expansion board and the feature expansion unit performs all or a part of the actual processes, thereby realizing the functions of the above-mentioned mode for embodying the present invention by the processes.

That is, the present invention is not limited to the above-mentioned mode for embodying the present invention, and can be realized by various configurations and forms within the scope of the gist of the present invention.

According to the present invention, a correct relative velocity vector can be obtained by a simple calculation based on the relative distance or the relative velocity obtained by a plurality of detectors such as a radar etc.

What is claimed is:

1. A detecting and ranging apparatus, comprising:
a first relative distance measurement unit to receive a reflected wave of a transmitted electromagnetic wave by an object to be detected, and thereby measuring a relative distance to the object to be detected;
a second relative distance measurement unit, arranged at a position different from a position of the first relative distance measurement unit, to receive a reflected wave of a transmitted electromagnetic wave by an object to be detected, and thereby measuring a relative distance to the object to be detected; and
an actual velocity vector calculation unit to calculate an actual velocity vector of the object to be detected moving with an angle made in a direction from the first relative distance measurement unit to the object to be detected or a direction from the second relative distance measurement unit to the object to be detected based on
a first relative velocity vector calculated using time differential of the relative distance measured by the first relative distance measurement unit;
a second relative velocity vector calculated using time differential of the relative distance measured by the second relative distance measurement unit; and
a circle which passes through a first point representing initial points of the first relative velocity vector and the second relative velocity vector, a second point representing a terminal point of the first relative velocity vector, and a third point representing a terminal point of the second relative velocity vector;
wherein the actual velocity vector calculation unit calculates the actual velocity vector of the object to be detected as a vector whose initial point is the first point and magnitude is the diameter of the circle.

2. A detecting and ranging apparatus, comprising:
a first relative velocity measurement unit to receive a reflected wave of a transmitted electromagnetic wave by an object to be detected, and thereby measuring a relative velocity to the object to be detected;
a second relative velocity measurement unit, arranged at a position different from a position of the first relative velocity measurement unit, to receive a reflected wave of a transmitted electromagnetic wave by an object to be detected, and thereby measuring a relative velocity to the object to be detected; and
an actual velocity vector calculation unit to calculate an actual velocity vector of the object to be detected moving with an angle made in a direction from the first relative velocity measurement unit to the object to be detected or a direction from the second relative velocity measurement unit to the object to be detected based on
the relative velocity measured by the first relative velocity measurement unit;
the relative velocity measured by the second relative velocity measurement unit; and
a circle which passes through a first point representing initial points of a first relative velocity vector and a second relative velocity vector, a second point representing a terminal point of the first relative velocity vector, and a third point representing a terminal point of the second relative velocity vector;
wherein the actual velocity vector calculation unit calculates the actual velocity vector of the object to be detected as a vector whose initial point is the first point and magnitude is the diameter of the circle.

3. A detecting and ranging apparatus, comprising:
a first measurement unit to receive a reflected wave of a transmitted electromagnetic wave by an object to be detected, and thereby measuring a relative distance and a relative velocity to the object to be detected;
a second measurement unit, arranged at a position different from a position of the first measurement unit, to receive a reflected wave of a transmitted electromagnetic wave by an object to be detected, and thereby measuring a relative distance and a relative velocity to the object to be detected; and
an actual velocity vector calculation unit to calculate an actual velocity vector of the object to be detected moving with an angle made in a direction from the first measurement unit to the object to be detected or a direction from the second measurement unit to the object to be detected based on
the relative distance and the relative velocity measured by the first measurement unit;
the relative distance and the relative velocity measured by the second measurement unit; and
a circle which passes through a first point representing initial points of a first relative velocity vector and a second relative velocity vector, a second point representing a terminal point of the first relative velocity vector, and a third point representing a terminal point of the second relative velocity vector;
wherein the actual velocity vector calculation unit calculates the actual velocity vector of the object to be detected as a vector whose initial point is the first point and magnitude is the diameter of the circle.

4. The apparatus according to claim 1, wherein:
the first relative distance measurement unit measures an angle made by a direction of the object to be detected from the first relative distance measurement unit and a traveling direction of the object to be detected; and
the first actual velocity vector calculation unit calculates an actual velocity vector of the object to be detected moving at the measured angle.

5. The apparatus according to claim 1, wherein the first relative distance measurement unit or the second relative distance measurement unit is a pulse radar.

6. The apparatus according to claim 1, wherein the first relative distance measurement unit or the second relative distance measurement unit is a frequency spread radar.

7. The apparatus according to claim 1, wherein the first relative distance measurement unit or the second relative distance measurement unit is an FMCW radar.

8. The apparatus according to claim 4, wherein the first relative distance measurement unit or the second relative distance measurement unit detects an angle in a mechanical sensing operation.

9. The apparatus according to claim 4, wherein the first relative distance measurement unit or the second relative distance measurement unit detects an angle in a monopulse system.

10. The apparatus according to claim 4, wherein the first relative distance measurement unit or the second relative distance measurement unit detects an angle in a beam forming method.

11. The apparatus according to claim 4, wherein the first relative distance measurement unit or the second relative distance measurement unit detects an angle in a subspace method.

12. The apparatus according to claim 4, wherein
the first relative distance measurement unit or the second relative distance measurement unit detects an angle in a maximum likelihood method.

13. A recording medium storing a detecting and ranging program product functioning in a computer of a detecting and ranging apparatus to perform a method comprising:
receiving a reflected wave of a transmitted electromagnetic wave by an object to be detected by a first relative distance measurement unit,
measuring a relative distance from the first relative distance measurement unit to the object to be detected;
receiving a reflected wave of a transmitted electromagnetic wave by an object to be detected by a second relative distance measurement unit arranged at a position different from a position of the first relative distance measurement unit,
measuring a relative distance from the a second relative distance measurement unit to the object to be detected; and
calculating an actual velocity vector of the object to be detected moving with an angle made in a direction from the first relative distance measurement unit to the object to be detected or a direction from the second relative distance measurement unit to the object to be detected based on
a first relative velocity vector calculated using time differential of the relative distance measured by the first relative distance measurement unit and
a second relative velocity vector calculated using time differential of the relative distance measured by the second relative distance measurement unit;
a circle which passes through a first point representing initial points of the first relative velocity vector and the second relative velocity vector, a second point representing a terminal point of the first relative velocity vector, and a third point representing a terminal point of the second relative velocity vector;
wherein the calculating calculates the actual velocity vector of the object to be detected as a vector whose initial point is the first point and magnitude is the diameter of the circle.

14. A recording medium storing a detecting and ranging program product functioning in a computer of a detecting and ranging apparatus to perform a method comprising:
receiving a reflected wave of a transmitted electromagnetic wave by an object to be detected by a first relative velocity measurement unit receives,
measuring a relative velocity of the first relative velocity measurement unit to the object to be detected;
receiving a reflected wave of a transmitted electromagnetic wave by an object to be detected by a second relative velocity measurement unit arranged at a position different from a position of the first relative velocity measurement unit,
measuring a relative velocity of the second relative velocity measurement unit to the object to be detected; and
calculating an actual velocity vector of the object to be detected moving with an angle made in a direction from the first relative velocity measurement unit to the object to be detected or a direction from the second relative velocity measurement unit to the object to be detected based on
the relative velocity measured by the first relative velocity measurement unit;
the relative velocity measured by the second relative velocity measurement unit; and
a circle which passes through a first point representing initial points of a first relative velocity vector and a second relative velocity vector, a second point representing a terminal point of the first relative velocity vector, and a third point representing a terminal point of the second relative velocity vector;
wherein the calculating calculates the actual velocity vector of the object to be detected as a vector whose initial point is the first point and magnitude is the diameter of the circle.

15. A recording medium storing a detecting and ranging program product functioning in a computer of a detecting and ranging apparatus to perform a method comprising:
receiving a reflected wave of a transmitted electromagnetic wave by an object to be detected by a first measurement unit,
measuring a relative distance and a relative velocity of the first measurement unit to the object to be detected;
receiving a reflected wave of a transmitted electromagnetic wave by an object to be detected by a second measurement unit arranged at a position different from a position of the first measurement unit;
measuring a relative distance and a relative velocity of the second measurement unit to the object to be detected; and
calculating an actual velocity vector of the object to be detected moving with an angle made in a direction from the first measurement unit to the object to be detected or a direction from the second measurement unit to the object to be detected based on
the relative distance and the relative velocity measured by the first measurement unit;
the relative distance and the relative velocity measured by the second measurement unit; and
a circle which passes through a first point representing initial points of a first relative velocity vector and a second relative velocity vector, a second point representing a terminal point of the first relative velocity vector, and a third point representing a terminal point of the second relative velocity vector;
wherein the calculating calculates the actual velocity vector of the object to be detected as a vector whose initial point is the first point and magnitude is the diameter of the circle.

16. A detecting and ranging apparatus, comprising:
first relative distance measurement means for receiving a reflected wave of a transmitted electromagnetic wave by an object to be detected, and thereby measuring a relative distance to the object to be detected;
second relative distance measurement means, arranged at a position different from a position of the first relative distance measurement means, for receiving a reflected wave of a transmitted electromagnetic wave by an object to be detected, and thereby measuring a relative distance to the object to be detected; and
an actual velocity vector calculation means for calculating an actual velocity vector of the object to be detected moving with an angle made in a direction from the first relative distance measurement means to the object to be detected or a direction from the second relative distance measurement means to the object to be detected based on
a first relative velocity vector calculated using time differential of the relative distance measured by the first relative distance measurement means;

a second relative velocity vector calculated using time differential of the relative distance measured by the second relative distance measurement means; and a circle which passes through a first point representing initial points of the first relative velocity vector and the second relative velocity vector, a second point representing a terminal point of the first relative velocity vector, and a third point representing a terminal point of the second relative velocity vector;

wherein the actual velocity vector calculation means calculates the actual velocity vector of the object to be detected as a vector whose initial point is the first point and magnitude is the diameter of the circle.

17. A detecting and ranging apparatus, comprising:

first relative velocity measurement means for receiving a reflected wave of a transmitted electromagnetic wave by an object to be detected, and thereby measuring a relative velocity to the object to be detected;

second relative velocity measurement means, arranged at a position different from a position of the first relative velocity measurement means, for receiving a reflected wave of a transmitted electromagnetic wave by an object to be detected, and thereby measuring a relative velocity to the object to be detected; and an actual velocity vector calculation means for calculating an actual velocity vector of the object to be detected moving with an angle made in a direction from the first relative velocity measurement means to the object to be detected or a direction from the second relative velocity measurement means to the object to be detected based on the relative velocity measured by the first relative velocity measurement means;

the relative velocity measured by the second relative velocity measurement means; and a circle which passes through a first point representing initial points of a first relative velocity vector and a second relative velocity vector, a second point representing a terminal point of the first relative velocity vector, and a third point representing a terminal point of the second relative velocity vector;

wherein the actual velocity vector calculation unit calculates the actual velocity vector of the object to be detected as a vector whose initial point is the first point and magnitude is the diameter of the circle.

18. A detecting and ranging apparatus, comprising:

first measurement means for receiving a reflected wave of a transmitted electromagnetic wave by an object to be detected, and thereby measuring a relative distance and a relative velocity to the object to be detected;

second measurement means, arranged at a position different from a position of the first measurement means, for receiving a reflected wave of a transmitted electromagnetic wave by an object to be detected, and thereby measuring a relative distance and a relative velocity to the object to be detected; and an actual velocity vector calculation means for calculating an actual velocity vector of the object to be detected moving with an angle made in a direction from the first measurement means to the object to be detected or a direction from the second measurement means to the object to be detected based on the relative distance and the relative velocity measured by the first measurement means;

the relative distance and the relative velocity measured by the second measurement means; and a circle which passes through a first point representing initial points of a first relative velocity vector and a second relative velocity vector, a second point representing a terminal point of the first relative velocity vector, and a third point representing a terminal point of the second relative velocity vector;

wherein the actual velocity vector calculation unit calculates the actual velocity vector of the object to be detected as a vector whose initial point is the first point and magnitude is the diameter of the circle.

* * * * *